United States Patent [19]

Brockwell et al.

[11] Patent Number: 5,063,506
[45] Date of Patent: Nov. 5, 1991

[54] COST OPTIMIZATION SYSTEM FOR SUPPLYING PARTS

[75] Inventors: John C. Brockwell, Endicott, N.Y.; Edward J. Collins, Boulder, Colo.

[73] Assignee: International Business Machines Corp., Armonk, N.Y.

[21] Appl. No.: 425,615

[22] Filed: Oct. 23, 1989

[51] Int. Cl.$^5$ ............................................. G06F 15/24
[52] U.S. Cl. .................................... 364/402; 364/401; 364/403
[58] Field of Search ............... 364/402, 403, 401, 408, 364/468

[56] References Cited

U.S. PATENT DOCUMENTS

| | | | |
|---|---|---|---|
| 3,703,630 | 11/1972 | Gelder | 235/151.3 |
| 4,459,663 | 7/1984 | Dye | 364/200 |
| 4,591,983 | 5/1986 | Bennett et al. | 364/403 |
| 4,628,435 | 12/1986 | Tashiro et al. | 364/130 |
| 4,642,766 | 2/1987 | Funk et al. | 364/402 |
| 4,642,768 | 2/1987 | Roberts | 364/408 |
| 4,646,238 | 2/1987 | Carlson, Jr. et al. | 364/403 |
| 4,648,023 | 3/1987 | Powell | 364/156 |
| 4,722,055 | 1/1988 | Roberts | 364/408 |
| 4,750,119 | 6/1988 | Cohen et al. | 364/401 |
| 4,750,121 | 6/1988 | Halley et al. | 364/408 |
| 4,751,640 | 6/1988 | Lucas et al. | 364/408 |
| 4,774,664 | 9/1988 | Campbell et al. | 364/408 |
| 4,799,156 | 1/1989 | Shavit et al. | 364/401 |
| 4,807,108 | 2/1989 | Ben-Arieh et al. | 364/148 |
| 4,827,423 | 5/1989 | Beasley et al. | 364/468 |
| 4,958,292 | 9/1990 | Kaneko et al. | 364/468 |

OTHER PUBLICATIONS

Ship Smart Program—Burlington Northern.
Lotus Spread Sheet.

*Primary Examiner*—Jerry Smith
*Assistant Examiner*—Russell E. Cass
*Attorney, Agent, or Firm*—Arthur J. Samodovitz

[57] ABSTRACT

A cost estimation system estimates the cost of supplying parts to a manufacturing facility. The system comprises a first database for storing cost information for various supply methods including air freight, ocean freight, land freight, warehouse storage, plant storage and material handling costs. A user selects a supply method for the parts, and has the option to select a percentage of one type of transportation and a percentage of an alternate type of transportation to serve as a back-up. A user also enters delivery frequency data indicating one or more frequencies of delivery to base a cost estimation. A computer processor then estimates the cost of supplying the parts at the one or more frequencies of delivery and the selected supply method. Finally, the cost estimates are presented to a user.

17 Claims, 10 Drawing Sheets

WELCOME TO THE COST OPTIMIZING SYSTEM

X GENERATE COST ESTIMATE
_ BUSINESS CASE SUMMARY

FIG.3

```
ITEM/PART NUMBER ________________
ITEM/PART NAME __________________________
SOURCE COMPANY __________________________
ITEM/PART PURCHASE    _ VENDOR DIRECT
                      _ PURCHASING OFFICE
                      _ INTERPLANT (DOMESTIC)
                      _ INTERCOMPANY (WORLD TRADE)  _ PART
                                                    _ MACHINE
FROM                                                DESTINATION
SOURCE COUNTRY       SOURCE STATE (U.S.)
_ AUSTRALIA      OR  _ ALABAMA           TO  _ ALABAMA
_ FRANCE             _ ARKANSAS              _ ARKANSAS
_ GERMANY            _ ARIZONA               _ ARIZONA
_ JAPAN              _ CALIFORNIA            _ CALIFORNIA
_ KOREA              _ COLORADO              _ COLORADO

PURCHASE PRICE ___________ PER UNIT OF MEASURE ___________
CURRENCY ___________ EXCHANGE RATE ___________ / 1 U.S. $
```

FIG.4

```
SPACE AND HANDLING COSTS USED   _ DETAILED SPACE & HANDLING COST
                                _ UPLIFT

LOGISTIC METHOD                 _ JUST IN TIME
                                _ WAREHOUSE STORE & DELIVER

ANALYSIS OF SHIPPING COSTS      _ DETAIL
                                _ SUMMARY ONLY
```

FIG.5

```
DIMENSIONS IN    _ (IN.)
                 _ (CM.)

WEIGHTS IN       _ (LB.)
                 _ (KG.)

PALLET TYPE      _ STD. 40"X 48", 40 LBS. EMPTY
                 _ OTHER SIZE ->
                 _ NOT ON PALLET

QUANTITY PER PALLET     ____________ PAIR
LOADED PALLET WEIGHT    ____________
LOADED PALLET HEIGHT    ____________

DOUBLE STACK   _YES
                     _NO

PF1 HELP      PF2 TOGGLEPF PF3 END    PF4 WHAT
PF5 CLASSIFY  PF6 UNKNOWN  PF7 UP     PF8 DOWN
PF9 WHAT-IF   PF10 HOW     PF11 WHY   PF12 COMMAND
```

FIG.6

```
PALLET LENGTH    _____ (IN.)
PALLET WIDTH     _____ (IN.)
PALLET HEIGHT    _____ (IN.)
EMPTY PALLET WEIGHT _____ (LB.)
```

FIG.7

```
CONTAINER LENGTH   _____ (IN.)
CONTAINER WIDTH    _____ (IN.)
CONTAINER HEIGHT   _____ (IN.)
WEIGHT OF UNIT     _____ (LB.)
UNITS PER CONTAINER _____ EACH
```

FIG.8

CASE REVIEW AND SUMMARY

CASE #1 _____
CASE #2 _____
CASE #3 _____

FREQUENCY OF DELIVERY _____ INPUT A `0´ FOR OPTIMUM

FIG.13

```
CASE#           ________
ITEM/PART NUMBER  ________
ITEM/PART NAME    ________
SOURCE COMPANY    ________
% SHIPPED VIA INT'L AIR (REMAINING % VIA OCEAN)      ____%
% SHIPPED VIA DOMESTIC AIR (REMAINING % VIA TRUCK)   ____%

VOLUME ________      _ YEARLY      LOGISTIC METHOD
                     _ QUARTERLY   (JIT OR WAREHOUSE & DELIVER)
                     _ MONTHLY
PROTECTIVE STOCK ____ DAYS      DAYS IN PORT   ________

LOWER BOUND FOR FREQUENCY OF DELIVERY ____DAYS
UPPER BOUND FOR FREQUENCY OF DELIVERY ____DAYS
OTHER COSTS $________
PURCHASE PRICE ________      PER________
CURRENCY ________            EXCHANGE RATE ________ /1 U.S. $

PF9 WHAT-IF
```

FIG.9

```
STORAGE MODULE              _ STACKER SYSTEM
                            _ CAROUSEL SYSTEM
                            _ RACK/TRUCK AREA
                            _ BULK

MANUFACTURING STORAGE       _ FLOOR
                            _ FLOW RACK
                            _ CAROUSEL
TYPE OF DISBURSEMENT        _ SHELF

_ DISBURSE TO PALLET QTY (DPQ)
                            _ DISBURSE TO BOX QTY (DBQ)
                            _ DISBURSE TO ORDER QTY (DOQ)
```

FIG.10

```
                                                    ┌─ 94
┌──────────────────────────────────────────────────────┐
│                  IMPORT DUTY FACTORS                 │
│                                                      │
│   HARMONIZED TARIFF CLASSIFICATION CODE _________    │
│                                                      │
│   NORMAL DUTY RATE ___________%                      │
│   ALTERNATE/ADDITIONAL DUTY RATE ____________%       │
│   ANTI-DUMPING/COUNTERVAILING DUTY RATE _______%     │
│                                                      │
│                                                      │
│   NOTES _________________________________            │
│                                                      │
│                                                      │
│      PF5 CLASSIFY  PF6 UNKNOWN                       │
│                                                      │
└──────────────────────────────────────────────────────┘
```

FIG.11

```
                                                    ┌─ 130
┌──────────────────────────────────────────────────────┐
│ PART         COMPANY      JAPAN           CALIFORNIA │
│ CLASS. CODE 1234567   TOTAL DUTY  5 % 140    YEN / 1 U.S. $
│ JUST IN TIME                      5 % INT'L. AIR  DAYS IN PORT 5
│ CASE # TEST 2              ┌─132  5 % DOMESTIC AIR
│ VOLUME 20000  YEARLY               PROTECTIVE STOCK (DAYS) 10
│ FREQUENCY OF DELIVERY 1      ▼     OPTIMUM 1
│ INT'L AIR              $     7,873.60   $     7,873.60
│ OCEAN                  $    15,775.57   $    15,775.57  ┌─ 133
│ DUTY                   $   100,000.00   $   100,000.00
│ BROKERAGE              $    24,416.00   $    24,416.00
│ TARIFF                 $   109,800.00   $   109,800.00
│ DOMESTIC AIR           $     6,224.40   $     6,224.40
│ COMMON CARRIER         $    35,897.55   $    35,897.55
│ INVENTORY CARRYING     $    49,450.00   $    49,450.00
│ OCCUPANCY & HDLG.      $       350.23   $       350.23
│ OTHER                  $       100.00   $       100.00
│                        ─────────────    ─────────────
│ TOTAL                  $   349,887.35   $   349,887.35
│                                                      │
│ $ / PAIR   PURCHASE PRICE IN US $   $       100.00   │
│ ADJ. $ / PAIR  135 ↘ $     117.49   $       117.49   │
│                                                      │
│ ==>       PF9 WHAT IF                                │
└──────────────────────────────────────────────────────┘
```

FIG.12

|  | BUSINESS CASE SUMMARY |  | FREQUENCY 5 |
|---|---|---|---|
| VOLUME | #1 2000 | #2 2000 | #3 2000 |
| SOURCE COMPANY | XYZ | ABC | GHI |
| FREQ. OF DELIVERY | 5 | 5 | 5 |
| INT'L AIR | $ 0.00 | $ 0.00 | $ 0.00 |
| OCEAN | $ 0.00 | $ 0.00 | $ 0.00 |
| DUTY | $ 0.00 | $ 0.00 | $ 0.00 |
| BROKERAGE | $ 0.00 | $ 0.00 | $ 0.00 |
| DOMESTIC AIR | $ 0.00 | $ 0.00 | $ 0.00 |
| COMMON CARRIER | $76,299.75 | $19,232.64 | $51,288.04 |
| INVENTORY CARRYING | $11,987.50 | $12,425.00 | $12,162.50 |
| OCCUPANCY & HDLG. | $ 9,217.60 | $ 9,217.60 | $ 9,217.60 |
| OTHER | $ 0.00 | $ 0.00 | $ 0.00 |
| TOTAL | $97,504.85 | $40,875.24 | $72,668.14 |
| US $ PER UNIT | $ 685.00 | $ 710.00 | $ 695.00 |
| ADJ. US $ PER UNIT | $ 733.75 | $ 730.43 | $ 731.33 |

FIG.14

COST OPTIMIZATION SYSTEM FOR SUPPLYING PARTS

BACKGROUND OF THE INVENTION

The invention relates generally to the optimization of logistics to support a manufacturing facility, and deals more particularly with a computer system which determines an optimum frequency of delivery of parts to a manufacturing facility based on transportation, occupancy, inventory carrying, material handling and other costs.

A critical element in minimizing the cost of producing a product is logistics i.e. the manner of obtaining parts for the manufacturing process. Factors such as frequency of delivery, mode of transportation, mode of storage, and manner of material handling significantly affect the cost of production. For example, in many situations it is desirable to order parts frequently and have them shipped directly to a production line as needed ("just-in-time") to minimize storage and carrying costs. However, such a strategy places much reliance on the shipper to consistently meet the schedule, and therefore may require a protective stock and substitute shippers. Thus, there are many factors to consider in comparing the cost of different logistic strategies, and it is critical to accurately estimate the cost of each.

Heretofore, the planning for logistics in the manufacturing organization has been disjointed and different aspects were assigned to different functions within the organization. For example, Purchasing may buy a part based on an economical order quantity, the unit cost, and some measure of quality. However, Production Control may order the part based on "rules of thumb", Industrial and Manufacturing Engineers may plan manufacturing floor space based on peak capacities and average stock levels, Traffic Analysts may consider transportation costs based on an overall average cost per pound and Distribution Space Planners may count on a given quantity of stock at an average cost per square foot. In many cases, these different decisions are made without consideration of the impact to the total logistics cost. For example, the Traffic Analyst recommends full truck load shipments to achieve a low cost per pound. The Industrial or Manufacturing Engineer attempts to reduce manufacturing floor space to accommodate one or two days of stock for the part under the auspices of a just-in-time (JIT) program. This saves manufacturing space and encourages a reduction in inventory carrying costs. The Production Control system sets up for either weekly or monthly orders. Planners in the distribution center or warehouse suggest that the part be delivered directly to the manufacturing line to eliminate their handling charges. If the part is to be delivered to the warehouse, the Planners will recommend that the part be moved in large volumes, because the costs of distribution are based on economies of scale. Space Planners for the warehouse recommend a just-in-time program so that the only parts in the warehouse storage modules are for protective stock. If the warehouse is to be used to store parts, the space planners will drive for low stocking levels, with frequent receipts and disbursements (in small volumes) of the part. While every group does their best to reduce the costs of logistics, the assumptions and conclusions are often conflicting. Also, cost estimation is hampered by disruptions in planned transportation methods.

Accordingly, a general object of the present invention is to provide a process and apparatus which, in a coordinated fashion, determines an optimum, logistics plan for supplying parts to a manufacturing facility.

A more specific object of the present invention is to provide a process and apparatus of the foregoing type which optimizes the ordering frequency based on transportation, occupancy, inventory carrying, material handling and other costs.

Another specific object of the present invention is to identify many significant factors in the cost of logistics, and develop a program and apparatus to accurately consider the costs associated with each of the factors including disruptions in planned transportation methods.

SUMMARY OF THE INVENTION

The invention resides in a coordinated, cost estimation system including a cost estimation computer program for estimating the cost of supplying parts to a manufacturing facility at one or more delivery frequencies. The program comprises a first database for storing cost information for various supply methods including air freight, ocean freight, land freight, warehouse storage, plant storage, and material handling costs. A user selects a supply method for the parts, which supply method impacts the cost of supplying the parts to the manufacturing facility. A user also enters delivery frequency data indicating one or more frequencies of delivery to base a cost estimation. A computer processor then estimates the cost of supplying the parts at the one or more frequencies of delivery and the selected supply method. Finally, the cost estimate(s) are presented to a user.

According to one feature of the invention, the supply methods comprise a percentage of air transportation and a percentage of land or ocean transportation for said parts over the same leg of a supply route. This takes into account the fact that a preferred type of transportation may not be available all the time; the other type serves as a back-up.

DETAILED DESCRIPTION OF THE PREFERRED EMBODIMENTS

Figure 1:
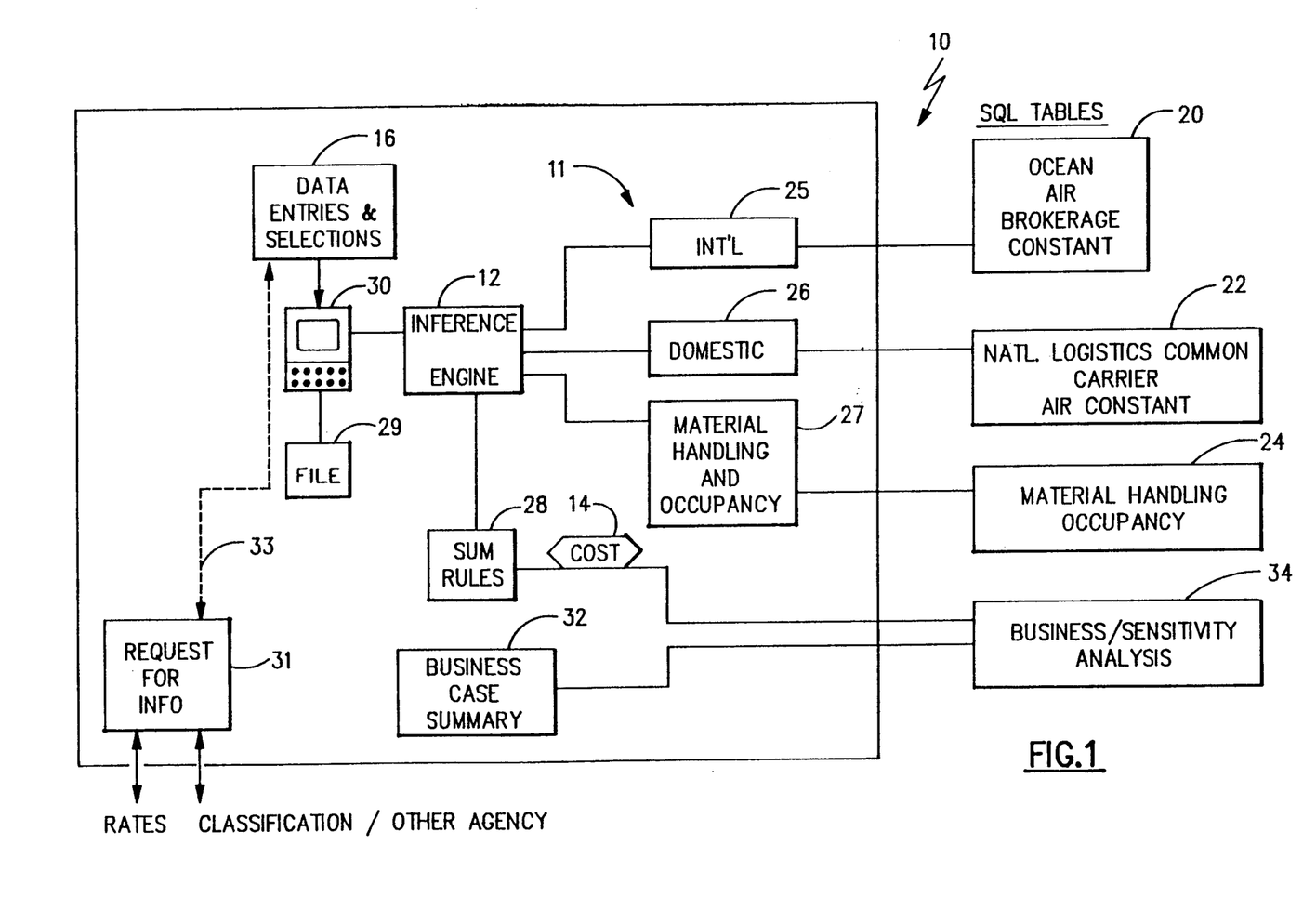
FIG. 1 is a block diagram illustrating the major components of the logistics optimization system according to the present invention.

Referring now to the drawings in detail wherein like reference numerals indicate like elements throughout the several views, FIG. 1 illustrates a cost optimization system for ordering parts, generally designed 10 according to the present invention. The term "parts" as used in this patent application encompasses discrete components, subassemblies, raw and finished materials, etc. System 10 is an expert system and comprises a computer program stored on a magnetic disk, tape etc. The program defines a knowledge base 11 including rules and an inference engine 12 to process the rules to arrive at a cost 14 based on the knowledge base 11 and logistics selections and data entries 16 made by a user. By way of example, knowledge base 11 uses an Expert System Environment ("ESE") shell ("Expert System Environment" and "ESE" are both trademarks of IBM Corp. of Armonk, N.Y.).

System 10 further comprises supply cost tables 20 in SQL/DS language ("SQL/DS" is a trademark of IBM Corp. of Armonk, N.Y.) of costs of different types and aspects of international freight such as the cost of ocean freight, the cost of air freight, brokerage fees, and a constant which estimates a buyer's agent fee. System 10 also comprises supply cost tables 22 of cost and other aspects associated with different types of domestic freight such as the cost of common carrier by land, cost of air freight, and a constant for the inventory carrying cost rate. It should be noted that for each part that is sourced outside of the United States, there is an international component of cost and a domestic component of cost in system 10. System 10 further comprises supply cost tables 24 of costs associated with material handling and occupancy of the parts. The computer program defines the tables, and the user enters the foregoing data of the tables for many instances of subsequent use. All of the tables are updated as prices change. Rules 25-28 in the knowledge base define how to read the tables and apply the appropriate cost factors to estimate the cost of supply.

However, rates for certain aspects of the logistics are not stored in the knowledge base because these rates change very frequently. Such rates must be input as a data entry by the user via a computer terminal 30 when running a consultation. If the user does not have the rates at hand, the user can request information 31 from central location via a computer link 33.

Via computer terminal 30, the user also makes selections 16 for a desired frequency of delivery or a test range of frequencies of delivery, the desired type of international transportation (if any), desired type of domestic transportation, and material handling and occupancy specifications including desired packaging type, place of storage, protective stock etc. as described in more detail below. The inference engine 12 and a computer processor within terminal 30 then determine the cost 14 for supplying the parts at the specified frequency or at the different frequencies of delivery within the specified range. Next, the terminal 30 prints out or displays results 32, and the user has the opportunity to change any of the aforesaid selections or inputs under a business sensitivity analysis 34 to yield a different logistics cost and compare all of the results in a business case summary 32 to determine the optimum conditions.

Figure 2A:
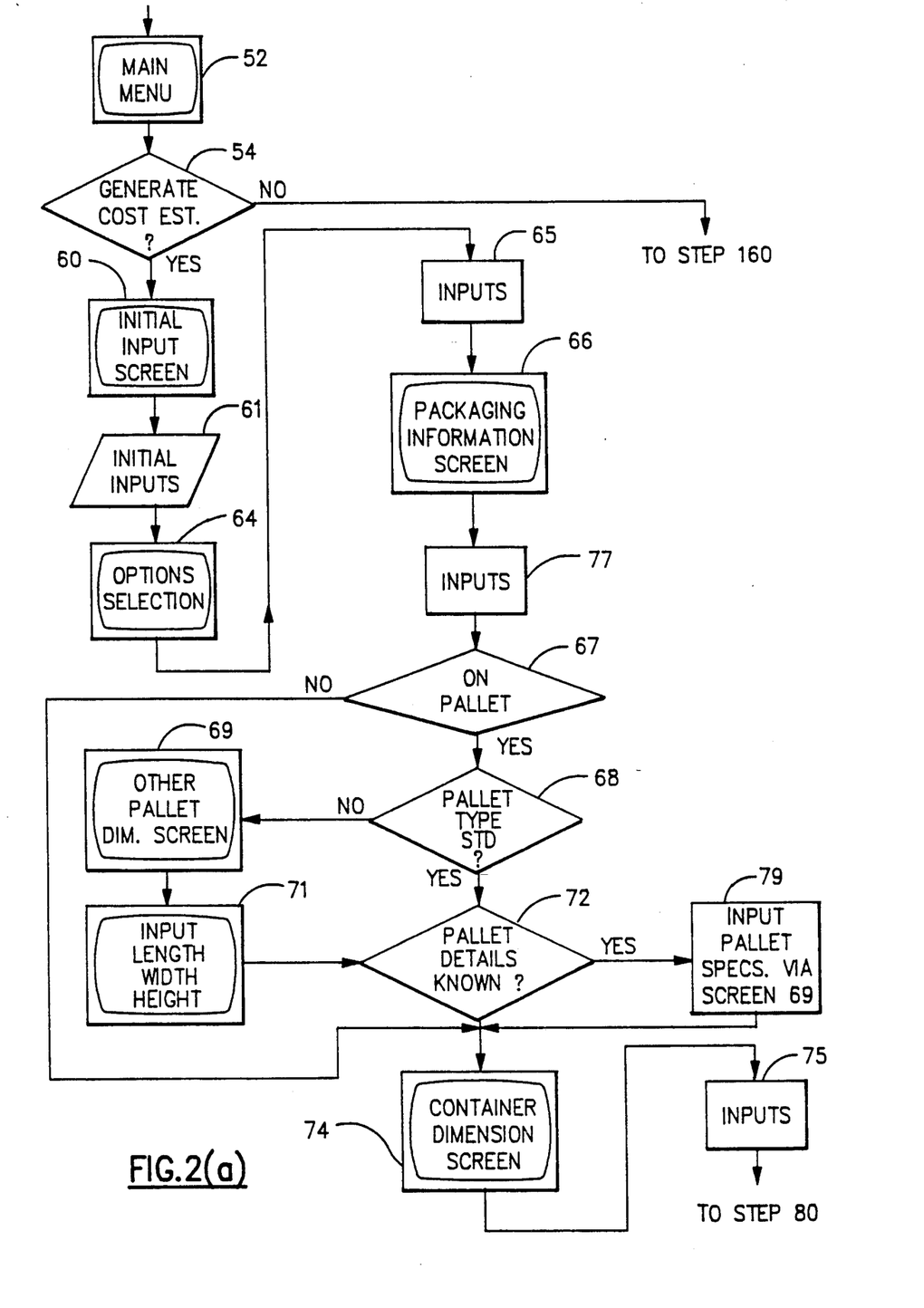
FIG. 2a-c form a flowchart illustrating the major steps of a computer program of FIG. 1 and the manner of utilizing the logistics optimization system.
Figure 2B:
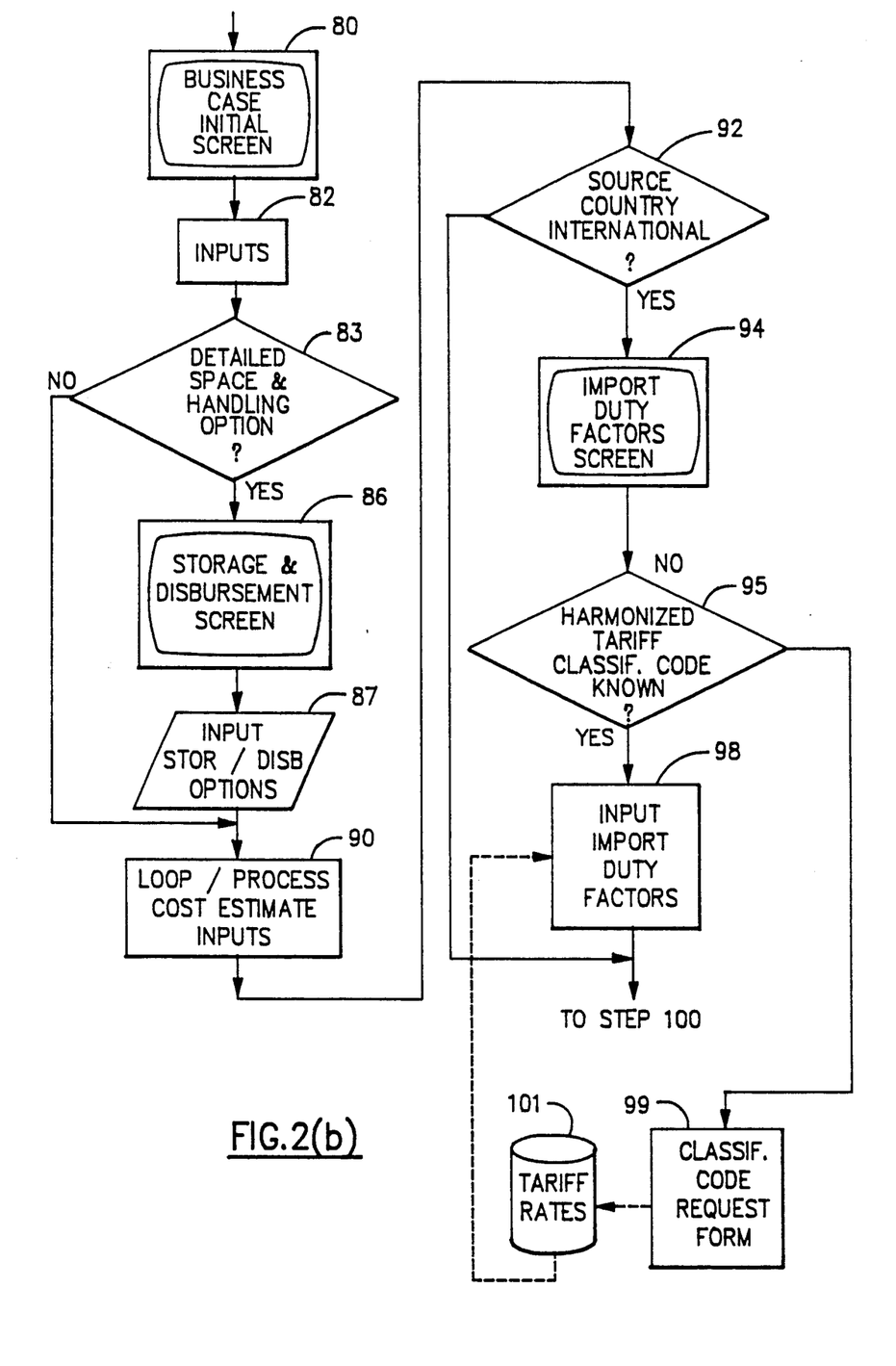
Figure 2C:
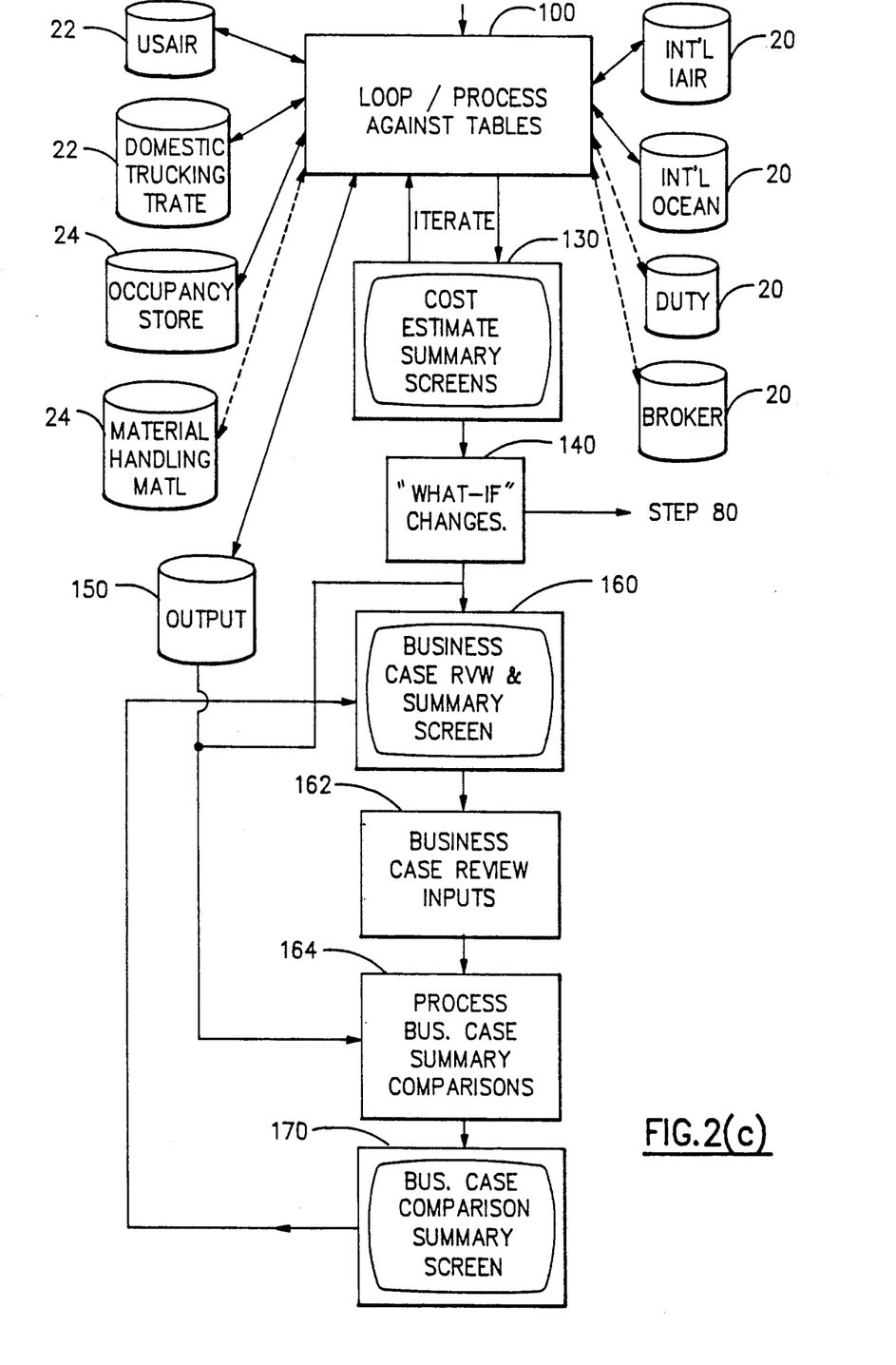
Figure 3:
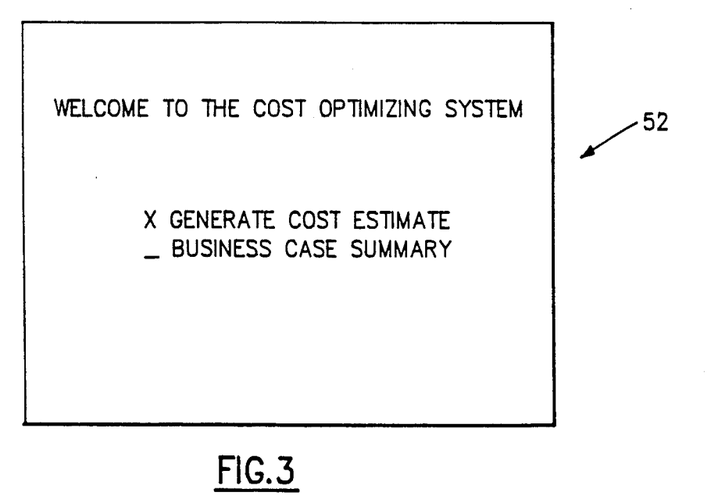
FIGS. 3–14 illustrate screens generated by the logistics optimization system of FIG. 1 during the course of executing the logistics optimization program, which screens are used to make selections, enter data, and display results.
Figure 4:
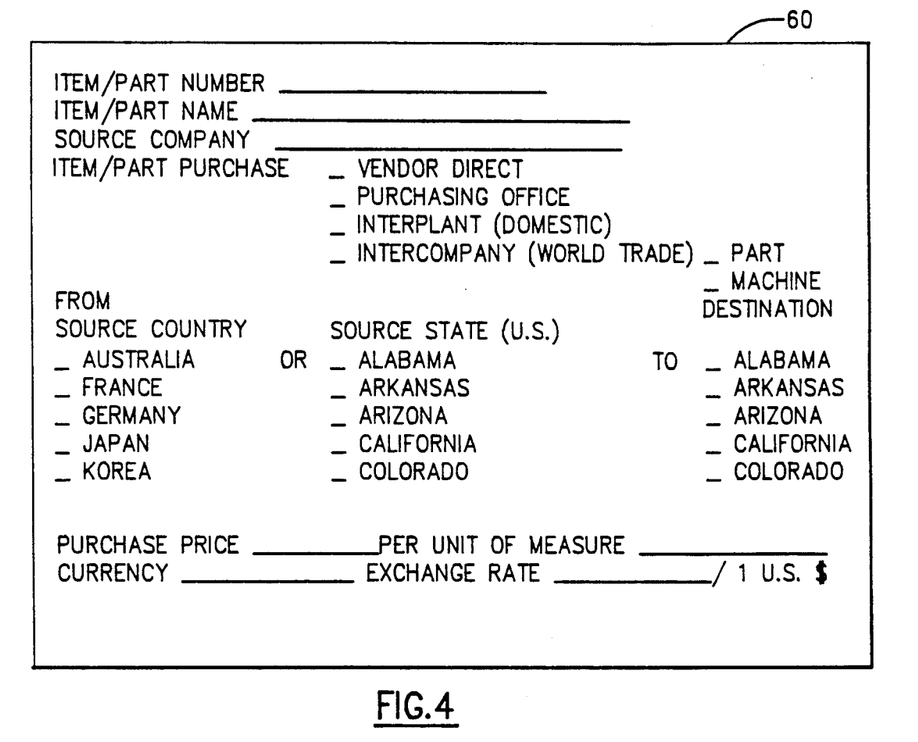

FIG. 2 illustrates the steps in utilizing cost optimization system (COS) 10. In step 50, system 10 is invoked, and in response, terminal 30 displays a main menu screen 52 illustrated in FIG. 3 (step 52). The main menu screen permits the user to select either a "general cost estimate" option or a "business case summary" option. The former is the starting point for making the cost optimization estimate. The latter is a summary of several cost estimates previously determined. This selection and the other selections and data entries made from the subsequent screens are stored in a file 29 which the expert system shell creates. If the general cost estimate option is selected (decision block 54), terminal 30 displays an initial input screen 60 illustrated in FIG. 4. Through this screen and a keyboard on terminal 30, the user enters a part (or machine) number, part name, source company, purchasing agent, source country or source state, part or machine type, destination state, purchase price, and current currency exchange rate (step 61). The knowledge base includes rules which correlate the purchasing agent to an international duty which is added to the cost. The purchasing price is expressed as a price per unit of measure where the unit of measure is at the option of the user.

Figure 5:
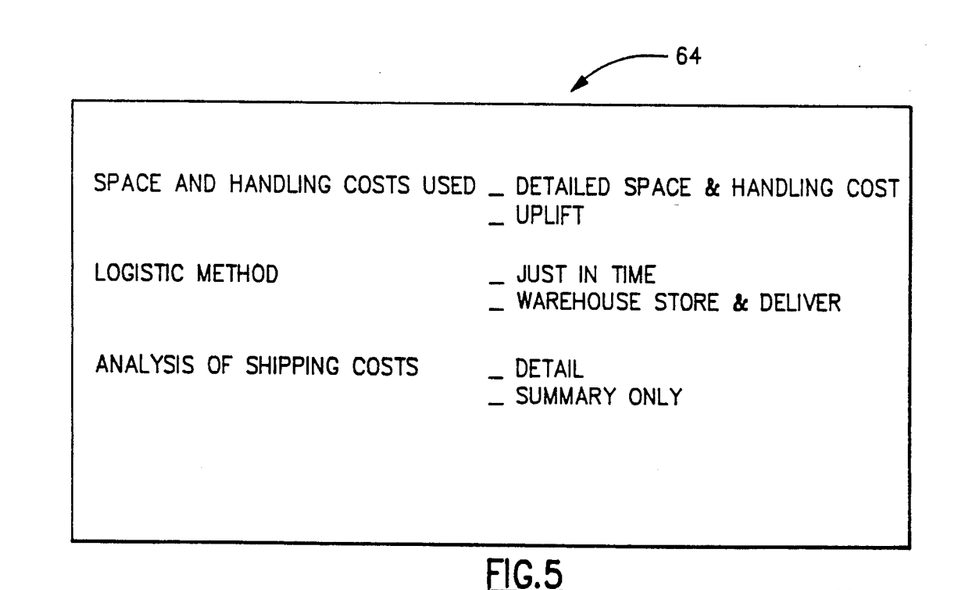

After each of the selections is made from screen 60, terminal 30 displays an "options selection" screen 64 illustrated in FIG. 5. From this screen, the user selects (step 65) either of two space and handling cost methods used in determining the logistics cost, detailed space and handling cost or uplift factor. The detailed space and handling option causes the inference engine to make a detailed analysis of the space and handling costs based on storage costs in a factory and a warehouse, and a handling cost. The uplift option adds a percent add-on to the purchase price. Screen 64 also presents the user with two options for a preferred logistics method, just-in-time or warehouse store and deliver, and the user selects one (step 65). Screen 64 also presents the user with two types of analysis and shipping cost methods for an output display, detailed or summary only.

Figure 6:
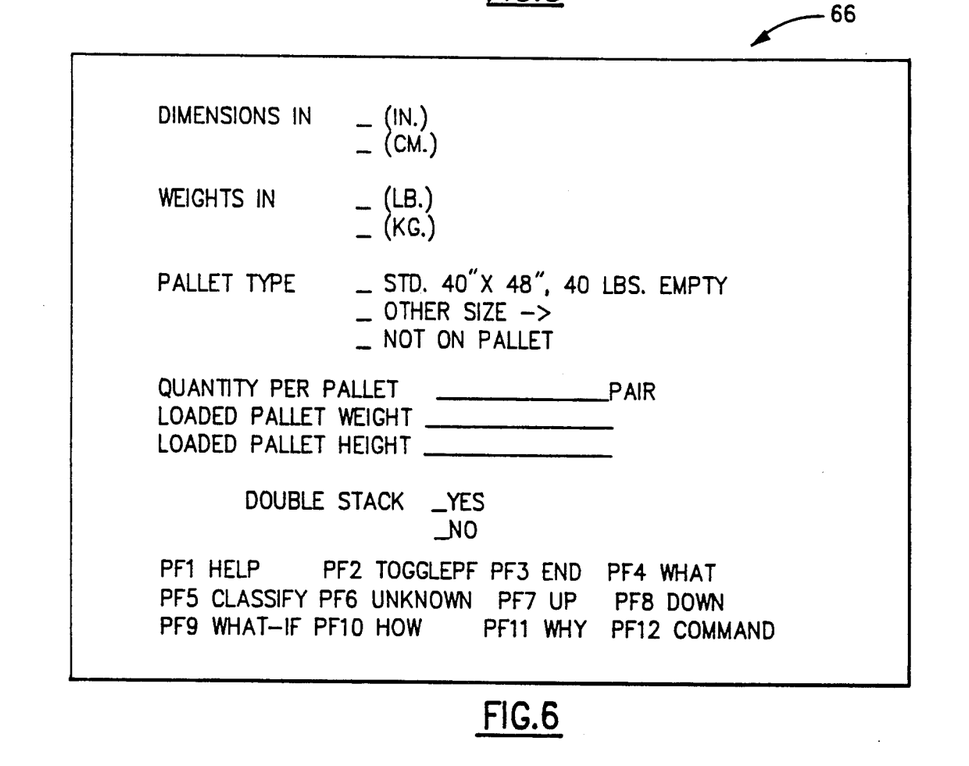
Figure 7:
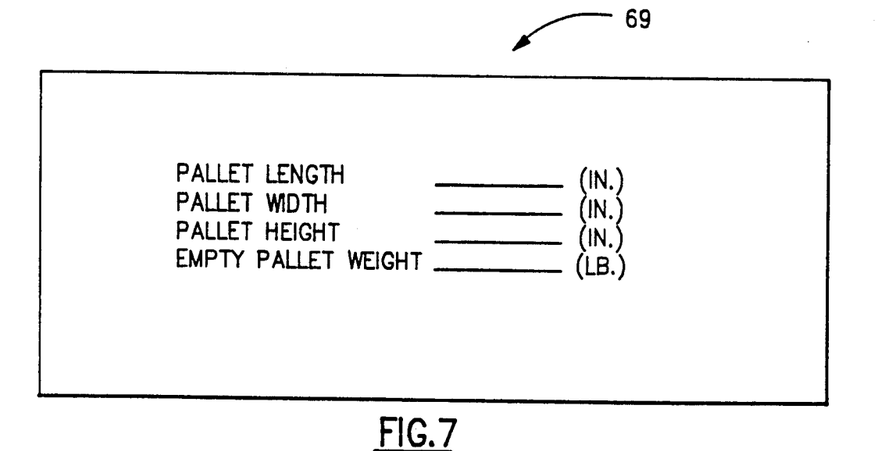
Figure 8:
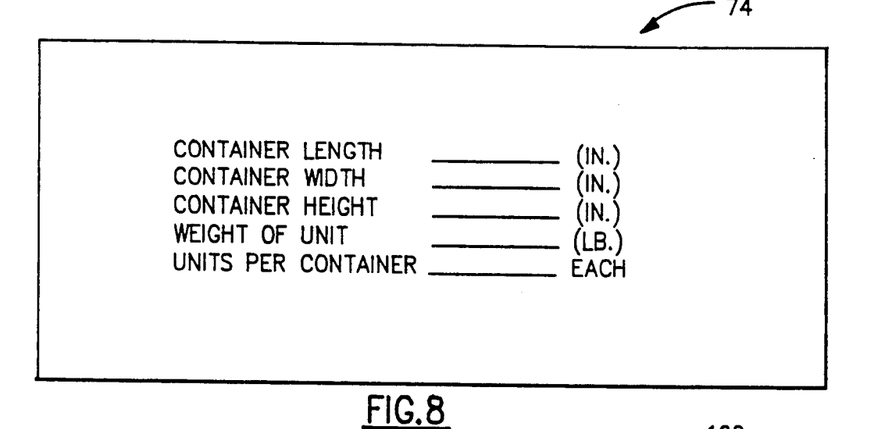

Next, system 10 displays a "packaging" screen 66 illustrated in FIG. 6, and the user specifies (step 77) the desired dimensions in either inches or centimeters of each package of the parts received, the weight in either pounds or kilograms of each package of the part received, and the pallet type and size on which the user desires the packages to be shipped and received. If the user selects a pallet (decision block 67) and the pallet is a non-standard type, "other size", then system 10 will display screen 69, illustrated in FIG. 7, and permit the user to enter a desired length, width and height (steps 68, 69 and 71). Also, the user specifies the quantity of parts per pallet, the loaded pallet weight and the loaded pallet height that is required and whether the pallet stacking is double or single. If the quantity of parts per pallet, pallet weight or height are known by the user (decision block 72), the data is entered directly via screen 66 (step 79). If not, the user can press a key and an input screen 74 illustrated in FIG. 8 requesting the desired container length, width, height and weight information will appear. This information is entered (step 75) and combined with the previous defined pallet type information to approximate the number of containers per pallet to be used.

Figure 9:
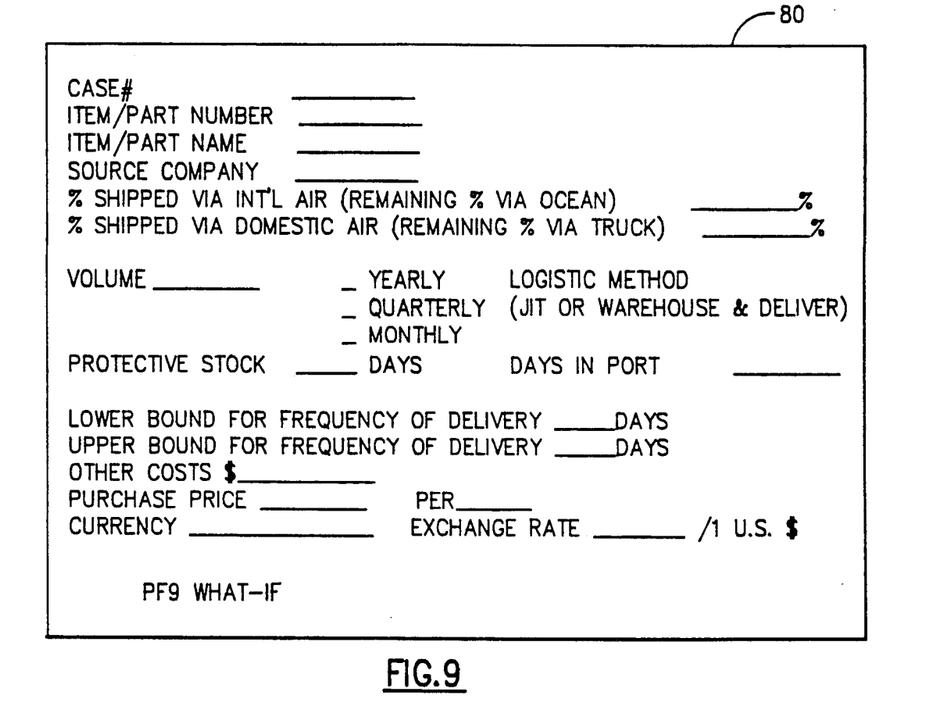

Next, system 10 displays a "business case initial input" screen 80 illustrated in FIG. 9 and the user makes the following entries (step 82). First, a case number is assigned. Next a part number and part name are entered to identify the selections and data entered through prior screens. Then, the source company name in entered. Next, the user enters a percentage of the total parts which are expected to be shipped via international air with the remaining percentage expected to be shipped by ocean. These percentages reflect the fact that despite the user's preference for one type of transportation, in a certain percentage of the cases, the other type of transportation likely will be required. For example, even though the user desires that all international freight be shipped by ocean to minimize cost, the user can expect some of those ocean shipments to be delayed by weather, strike, or mechanical failure, and therefore must incur the additional expense of shipment by air in these circumstances. Similar types of percentage entries are made for shipments via domestic air with the remaining percentage being made by truck. This again accounts for reasonable expectations as to the necessity of one type of transportation despite the preference for the other type of transportation. For example, even though the user may prefer to have all of the parts shipped by truck to minimize the cost, the user can reasonably predict that a certain percentage of the shipments must be made by air to fill-in when the truck shipments are interrupted or delayed by strike, mechanical failure, weather, or other factors. It should be noted that for sources outside of the United States, domestic shipping costs are incurred in addition to international shipping costs, and both entries are made via screen 80. Next the user enters the required volume of parts per year, quarter or month, the logistics method—just-in-time or warehouse and delivery, and the amount of days of protective stock that are required. Also, the user enters the number of days in port during which the user expects the international parts to wait for customs' clearance and broker handling before subsequent domestic shipment to the destination. A typical wait is approximately six days. The protective stock is the minimum number of units required on hand at all times to prevent critical outages and supply problems. The user also enters a lower bound and an upper bound for the frequency of delivery, for example, the lower bound may be one delivery per one day and the upper bound may be one delivery per ten days. As described in more detail below, this will cause system 10 to determine the cost based on each of ten delivery frequencies from one day to ten days in equal steps. The user is also requested to enter "Other Costs" which indicate miscellaneous costs, expense of trips to vendor and expense of tooling assists. Then, the user enters the purchase price per quantity, the currency in which the purchase price is expressed, and the exchange rate.

Figure 10:
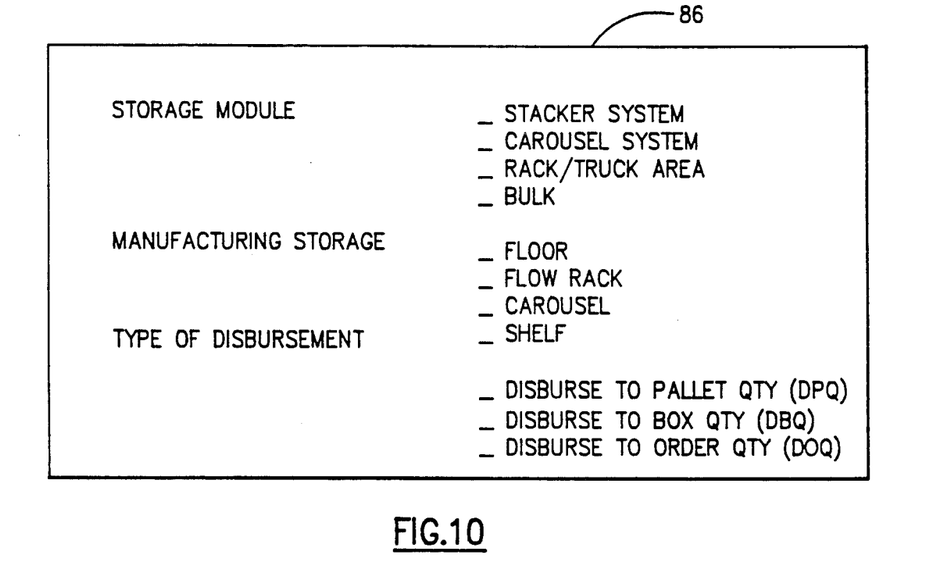

If the detailed space and handling option has been selected from screen 64 (decision block 83), system 10 displays a "storage and disbursement options" screen 86 illustrated in FIG. 10. If screen 86 is presented, the user then selects an appropriate storage module i.e. Automated Storage and Retrieval System, Carousel System, Rack/Truck Area, or Bulk storage (step 87). For each of these four types of storage modules, system 10 has stored in its database a cost associated with each type. Also from screen 86, the user selects a type of manufacturing storage i.e. floor storage, flow rack storage, carousel storage or shelf storage. The system 10 database also has a cost associated with each type of storage. Also from screen 86, the user selects a type of disbursement i.e. disbursement to pallet quantity (DPQ), disbursement to box quantity (DBQ), or disbursement to order quantity (DOQ). The first of the three disbursement methods is the least expensive and means that the products are disbursed by pallet, and the quantity of each disbursement is determined by the number that fit on the pallet. The second type of disbursement is more expensive and provides for disbursements by boxes such that the product can be disbursed in as small quantities as fit in a single box. The third type of disbursement method described above is the most expensive, and is made per order down to a single unit of product. The third method of disbursement to order quantity is intended to minimize the amount of product stored in the factory and to match the on-hand supply to the requirements for a day, week, etc. as desired by the user.

Next, system 10 processes the information and options entered above to determine occupancy and material handling costs. (step 90).

Figure 11:
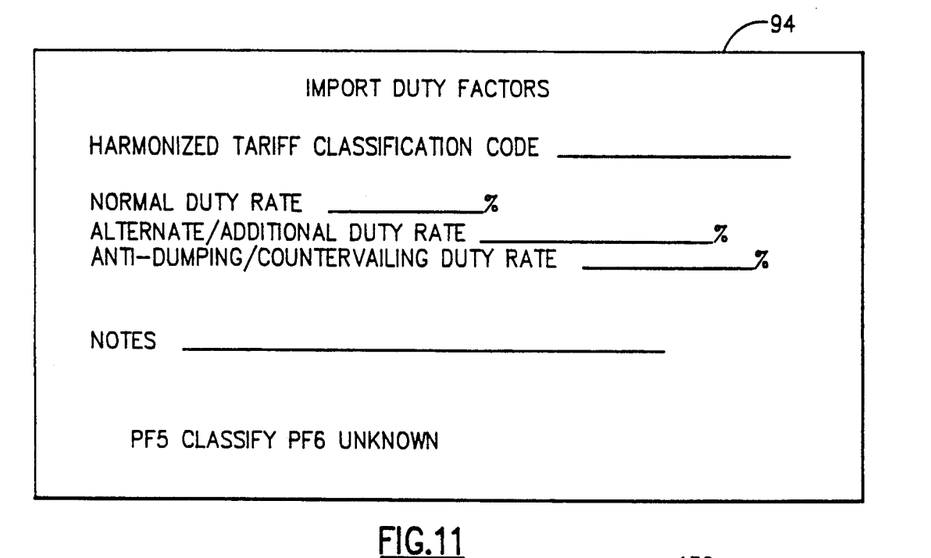

If the source country is outside of the United States (decision block 92), then system 10 presents screen 94 illustrated in FIG. 11 to obtain import duty factors. If a harmonized tariff classification code is known (decision block 95), the user enters (step 98) the code which indicates a classification code, a normal duty rate, an alternate, additional duty rate if applicable, and an anti-dumping/countervailing duty rate if applicable. Also, the user can enter notes such as pending legislation or administrative rules. However, if the harmonized tariff classification code is not known (decision block 95), then system 10 prints out a classification code information request from 99 which the user can complete and send to an appropriate agency 101 to determine the proper harmonized tariff classification code.

Next, system 10 processes all of the foregoing data entries and selections to determine the costs associated with each delivery frequency specified in screen 80 (step 100). These costs are based on SQL/DS tables 20, 22 and 24, rules 25–28 and the data input by the user indicated by the tables 20, 22 and 24. In the illustrated embodiment the rules simulate the following equations which yield the cost based on the data input and SQL/DS tables.

1. Total Cost=International Air Cost +Ocean Cost+Brokerage Cost+Duty Cost+Buyer's Agent Cost+Domestic Air Cost +Trucking Cost+Inventory Carrying Cost+Occupancy Cost+Material Handling Cost+Other Costs
2. Occupancy Cost=(Net productive square feet (of chosen storage module) * (occupancy rate of module * number of pallets in module) / (time in storage in days)
3. Domestic Air Cost=appropriate rate * shipment weight * frequency of shipment for time period * percentage of air shipments
4. Trucking Cost=appropriate rate * shipment weight * frequency of shipment for time period * percentage of truck shipments
5. Material Handling Cost=operation rate * number of pallets * frequency of operation for time period
6. Inventory Carrying Cost=(inventory rate * purchase price * ((daily going rate * transit time)+(-(daily going rate * frequency of delivery /2)+protective stock)) / (252/ time period in days)
7. Ocean Cost=appropriate rates and charges * weight or volume of shipment * frequency of shipment for time period * percentage of ocean shipments
8. International Air Cost=appropriate rates and charges + weight or volume of shipment * frequency of shipment for time period * percentage of international air shipments
9. Duty Cost=appropriate % * purchase price * volume
10. Buyer Agent's Costs=appropriate % * purchase price * volume
11. Brokerage Cost=(flat fee+rate per pound+rate per line item+fringes) * frequency of delivery After the costs are calculated, system 10 displays a cost estimate summary screen 130 (FIG. 12), which summary includes the costs resulting from the present iteration 132 of the delivery frequency as well as a cost summary 133 from a previous optimum delivery frequency. It should be noted that at the time screen 130 was displayed, only one iteration was made (based on daily delivery) so that the optimum cost summary is the same as the summary for the first iteration of the frequency delivery. After each subsequent iteration (ex. delivery frequency equals two days, three days, . . . ten days in the foregoing example), the information of the present iteration 132 is updated. The optimum information 133 is also updated if a better cost estimate results from the subsequent iterations.

Figure 12:
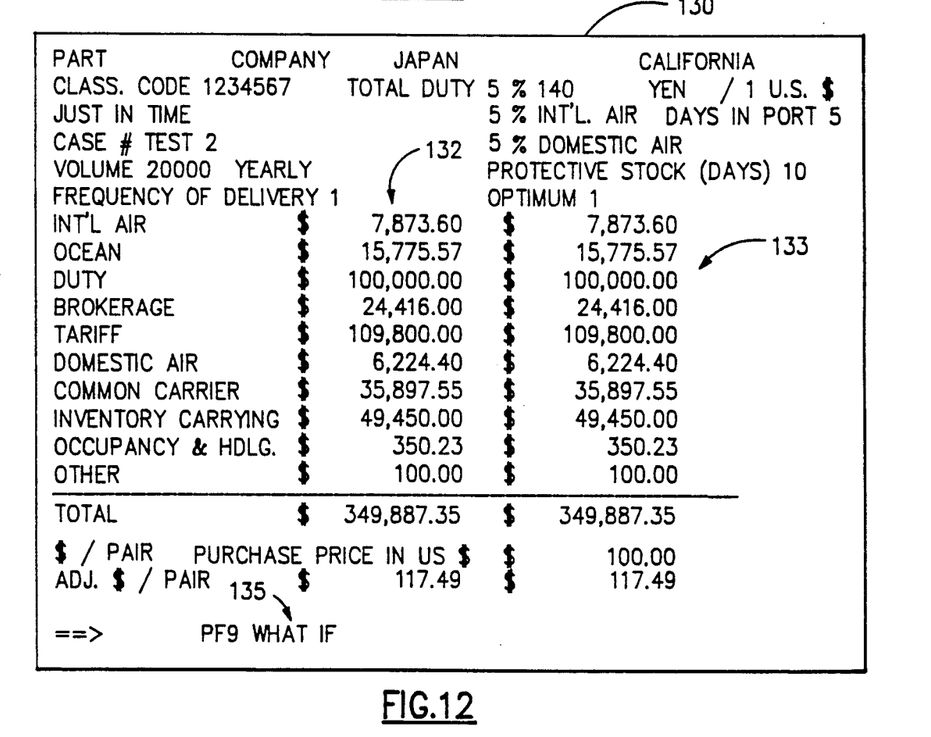

Screen 130 displays, in addition to the costs for the delivery frequencies, the cost for each component of the delivery cost including the cost of international air freight, ocean freight, duty, brokerage, buyer agent's fees, domestic air freight, common carrier freight, inventory carrying costs, occupancy and handling costs, and other costs in tabular form. While screen 130 is displayed, the user can select a "PF 9" function key 135 to enter into a "what if" mode to call up and subsequently change any of the selections or data entries made above on screen 80 (step 140). This causes system 10 to calculate a new cost summary associated with the new data. The display of the cost of each element is useful in the "what if" mode because it identifies expensive cost elements that could be reduced by an alternate supply method. After the "what if" function key is selected, system 10 loops back to screen 80 to repeat the display of screens 80. Each of the new cost estimate summaries will appear in a new screen such as 130. All of the information contained in the cost estimate summaries 130 is stored in another database 150.

Figure 13:
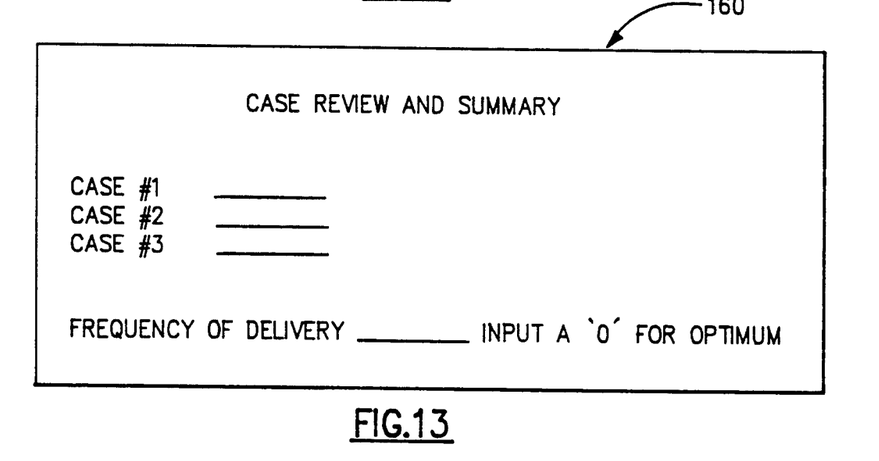

Next, system 10 presents a "business case review and summary" screen 160 (FIG. 13) in which the costs associated with each set of data inputs and selections are requested. Up to three cases are displayed for a specified delivery frequency or for the optimum delivery frequency for each case as selected by the user (step 162). System 10 then processes the business case summary inputs and deposits the results in output database 150 (step 164).

Figure 14:
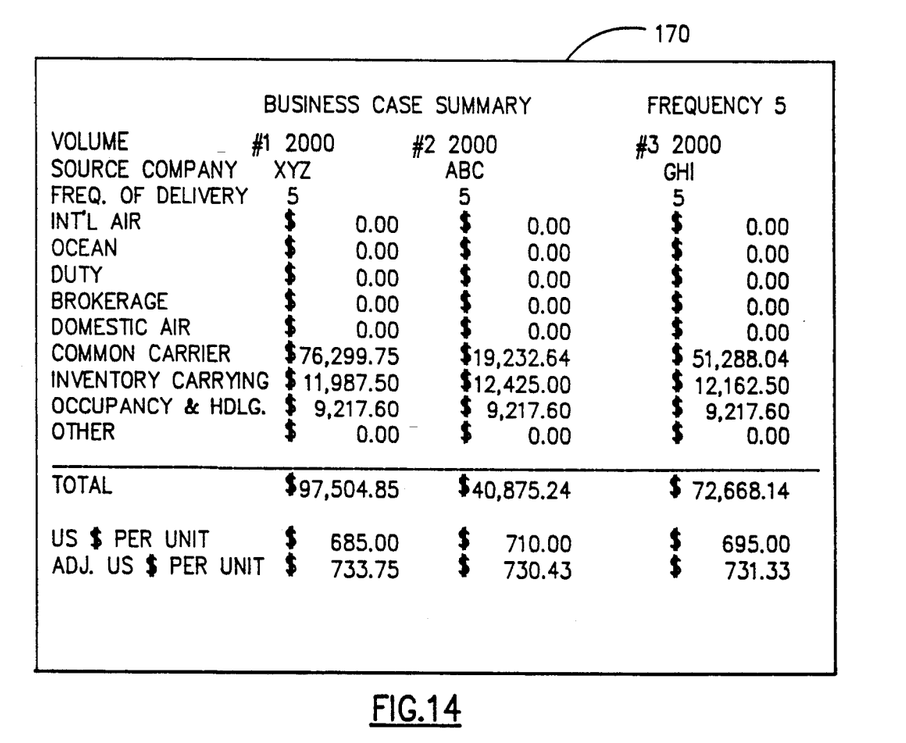

Finally, system 10 displays "business case comparison summary" screen 170 (FIG. 14) in which the cost associated with each case is displayed.

Based on the foregoing, a cost optimization system according to the present invention has been disclosed. However, numerous modifications and substitutions may be made without deviating from the scope of the invention. For example, a more detailed purchasing model may be defined. Therefore, the invention has been disclosed by way of illustration and not limitation, and reference should be made to the following claims to determine the scope of the invention.

We claim:

1. A computer system for estimating the cost of supplying parts to a manufacturing facility at one or more delivery frequencies and a selected supply method, said system comprising:

first database definition means for defining a first database to simultaneously store cost information for a plurality of alternate supply methods;

option entry means for user selection of at least one of said supply methods for said parts, said supply method impacting the cost of supplying said parts to said manufacturing facility, said option entry means permitting a user to select a nonzero percentage of air transportation and a nonzero percentage of land transportation for said parts over the same leg of a supply route;

data entry means for user entry of delivery frequency data indicating one or more preferred frequencies of delivery to base a cost estimation;

storage means, coupled to said option entry means and said data entry means, for storing said selections and data; and processing means, coupled to said first database and said storage means, for estimating the cost of supplying said parts at said one or more frequencies of delivery and the selected supply method.

2. A computer system as set forth in claim 1 wherein said supply methods comprise space and handling methods.

3. A computer system as set forth in claim 1 wherein said supply methods comprise just-in-time and warehouse store and deliver methods.

4. A computer system as set forth in claim 1 wherein said alternate supply methods comprise plant floor storage vs. warehouse storage methods, and the user can use said option entry means to select either one of said storage methods.

5. A computer system as set forth in claim 1 wherein said data entry means permits user entry of duty rates.

6. A computer system as set forth in claim 1 wherein said data entry means permits the entry of minimum and maximum delivery frequencies; and said processing means estimates costs based on a plurality of delivery frequencies between said minimum and maximum delivery frequencies.

7. A computer system as set forth in claim 6 wherein said processing means identifies an optimum one of said delivery frequencies for minimizing costs.

8. A computer system as set forth in claim 1 wherein said data entry means receives data entries defining a level of protective stock, and said processing means bases in part a cost estimation on said level.

9. A computer system as set forth in claim 1 wherein said supply method comprise air, ocean and land freight.

10. A computer system as set forth in claim 1 further comprising display means, coupled to said processing means, for displaying said cost estimate and an itemization of costs for separate elements of said cost estimate, said elements corresponding to said selected supply method; and means, coupled to said display means, for changing said selected supply method and directing said processor means to determine a new cost estimate.

11. A computer system as set forth in claim 1 wherein said percentages of air transportation and land transportation total one hundred percent.

12. A computer system for estimating the cost of supplying parts to a manufacturing facility, said system comprising:

first database definition means for defining a first database to store cost information for a plurality of alternate transportation methods for the same leg of a supply route, and cost information for other components of a logistics plan;

option entry means for user selection of a nonzero amount of use of one of said transportation methods and a nonzero amount of alternate use of another one of said transportation methods for the same leg of said supply route, and selection from said other components of said logistics plan;

storage means, coupled to said option entry means, for storing said selections; and processing means, coupled to said first database and said storage means, for estimating the cost of supplying said parts at the selected amounts of use of said transportation methods for the same leg of said supply route and the other selected components of said logistics plan.

13. A computer system as set forth in claim 12 wherein said amounts of use of said transportation methods for said leg of said supply route total one hundred percent.

14. A computer system as set forth in claim 12 wherein said option entry means permits said user to select a nonzero percentage of air transportation and a nonzero percentage of land transportation for said parts over the same leg of said supply route.

15. A computer system as set forth in claim 12 wherein said option entry means permits said user to select a nonzero percentage of international air transportation and a nonzero percentage of ocean transportation for said parts over the same leg of said supply route.

16. A computer system for estimating the cost of supplying parts to a manufacturing facility at a selected supply method, said system comprising:

first database definition means for defining a first database to simultaneously store cost information for a plurality of alternate supply methods;

option entry means for user selection of at least one of said supply methods for said parts, the selected supply method or methods impacting the cost of supplying said parts to said manufacturing facility, said option entry means permitting said user to select a nonzero percentage of one type of transportation and a nonzero percentage of another type of transportation for said parts over a same leg of a supply route;

storage means, coupled to said option entry means, for storing said selection; and processing means, coupled to said first database and said storage means, for estimating the cost of supplying said parts based on a combination of the selected percentages of use of said transportation methods for the same leg of said supply route.

17. A computer system as set forth in claim 16 wherein said percentages of transportation for said same leg of said supply route total one hundred percent.

* * * * *